US012669637B2

(12) United States Patent
    Bruck

(10) Patent No.: US 12,669,637 B2
(45) Date of Patent: Jun. 30, 2026

(54) FOCAL POLARIZATION BEAM DISPLACER

(71) Applicant: Cisco Technology, Inc., San Jose, CA (US)

(72) Inventor: Roman Bruck, Vienna (AT)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 17/648,634

(22) Filed: Jan. 21, 2022

(65) Prior Publication Data

US 2023/0236348 A1    Jul. 27, 2023

(51) Int. Cl.
     *G02B 5/30*     (2006.01)
     *G02B 6/42*     (2006.01)
     *G02B 27/28*    (2006.01)
     *G02F 1/095*    (2006.01)

(52) U.S. Cl.
     CPC ......... *G02B 5/3083* (2013.01); *G02B 6/4209* (2013.01); *G02F 1/0955* (2013.01); *G02B 27/28* (2013.01)

(58) Field of Classification Search
     CPC ...... G02B 5/3083; G02B 5/30; G02B 5/3008; G02B 27/28; G02B 27/286; G02B 6/4209; G02B 6/272; G02F 1/0955; G02F 1/095; G02F 1/13363
     See application file for complete search history.

(56) References Cited

U.S. PATENT DOCUMENTS 9,885,815 B2 *  2/2018  Du ......................... H01S 5/0687
9,989,700 B1 *  6/2018  Ayliffe ................... G02F 1/0955

12,034,266 B2 *  7/2024  Chen .................... G02B 6/4204
2001/0053022 A1 *  12/2001  Tai ...................... H01S 3/06754
                                                    359/484.03
2002/0089745 A1 *  7/2002  Huang ................... G02F 1/093
                                                    359/484.03

(Continued)

FOREIGN PATENT DOCUMENTS

CA     2265236 A1 *  9/1999    .......... G02B 27/283
EP     1168035 A2     1/2002

(Continued)

OTHER PUBLICATIONS

PCT, Notification of Transmittal of The International Search Report and The Written Opinion of The International Searching Authority, or The Declaration for Application PCT/US2022/081853 dated Apr. 26, 2023.

*Primary Examiner* — Thomas A Hollweg
*Assistant Examiner* — Mary A El-Shammaa
(74) *Attorney, Agent, or Firm* — Patterson + Sheridan, LLP

(57) ABSTRACT

Embodiments herein describe a focal polarization displacer with a birefringent crystal disposed within the focal region of a lens. The birefringent crystal separates optical signals into at least two separate signals based on having different polarization states and an optical axis of the birefringent crystal is set so that focal points of the two separate signals are at an output surface of the polarization displacer where the two separate signals are output from the polarization displacer. This output surface can be a surface of the birefringent crystal or a surface of additional layer coupled to the crystal such as a polarization rotator or dielectric layer.

20 Claims, 7 Drawing Sheets

(56) References Cited

U.S. PATENT DOCUMENTS

| | | | | |
|---|---|---|---|---|
| 2003/0174237 A1* | 9/2003 | Lee | | H04N 13/211 |
| | | | | 348/E13.009 |
| 2003/0223670 A1 | 12/2003 | Nikolov et al. | | |
| 2005/0174640 A1* | 8/2005 | Chen | | G02B 27/283 |
| | | | | 359/484.02 |
| 2008/0087378 A1* | 4/2008 | Washburn | | G02F 1/31 |
| | | | | 156/60 |
| 2008/0218680 A1* | 9/2008 | Yuan | | G02F 1/13363 |
| | | | | 349/196 |
| 2012/0263459 A1 | 10/2012 | Komiya | | |
| 2014/0185139 A1 | 7/2014 | Miao et al. | | |
| 2015/0316722 A1 | 11/2015 | Miao et al. | | |
| 2016/0011564 A1 | 1/2016 | Tanabe et al. | | |
| 2016/0147018 A1* | 5/2016 | Deng | | G02B 6/2938 |
| | | | | 359/489.09 |
| 2016/0377811 A1* | 12/2016 | Goodwill | | G02B 6/34 |
| | | | | 385/24 |
| 2017/0146736 A1 | 5/2017 | Verslegers et al. | | |
| 2017/0343739 A1* | 11/2017 | Bauters | | G02B 6/27 |
| 2020/0073056 A1* | 3/2020 | Suh | | H04Q 11/0005 |

FOREIGN PATENT DOCUMENTS

| | | | | | |
|---|---|---|---|---|---|
| EP | 1967900 A1 * | 9/2008 | | | G02B 27/283 |
| JP | 2001154149 A | 6/2001 | | | |
| WO | WO-9722034 A1 * | 6/1997 | | | G02B 27/283 |
| WO | WO-0011510 A1 * | 3/2000 | | | G02B 6/272 |
| WO | 2004104664 A1 | 12/2004 | | | |
| WO | WO-2015081806 A1 * | 6/2015 | | | G02B 27/1006 |
| WO | WO-2016206537 A1 * | 12/2016 | | | G02B 6/126 |
| WO | WO-2021119377 A1 * | 6/2021 | | | G02B 26/0875 |
| WO | 2021170200 A1 | 9/2021 | | | |
| WO | WO-2021223361 A1 * | 11/2021 | | | G02B 6/12019 |

* cited by examiner

FOCAL POLARIZATION BEAM DISPLACER

TECHNICAL FIELD

Embodiments presented in this disclosure generally relate to polarization beam displacers.

BACKGROUND

A polarization splitting component separates or splits different polarizations from an optical signal (e.g., P- and S-polarizations). To split polarizations, currently polarization beam splitters (PBSs) or polarization beam displacers (PBDs) are used. In a PBS, a special coating is used to selectively reflect one polarization. This coating can be a multi-layer stack of dielectric materials. PBSs can be created from discrete optical components that are precision-aligned on an optical bench. Alternatively, a coated prism and a reflection-coated parallelogram can be permanently attached to each other to create an integrated version.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
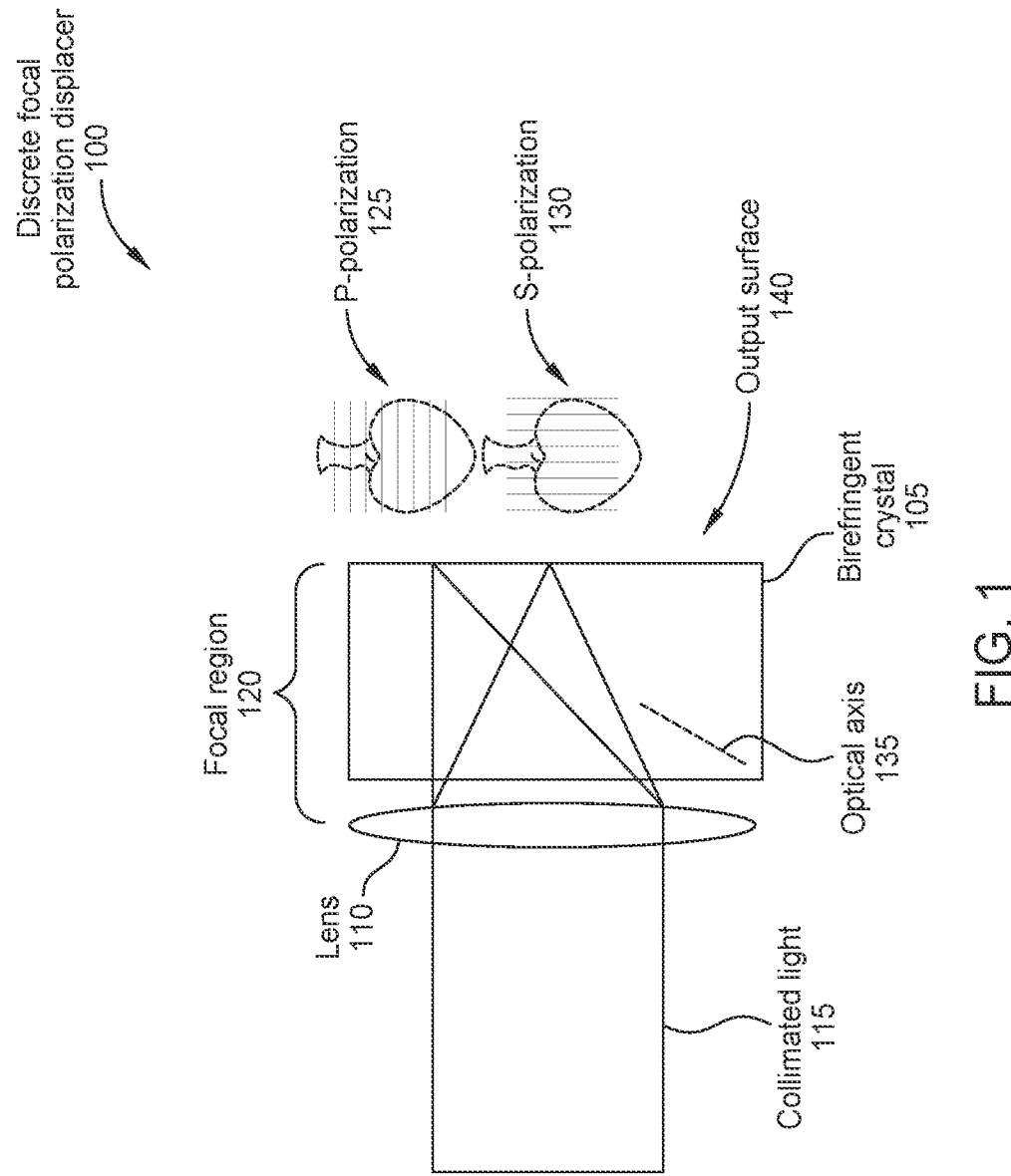
FIG. 1 illustrates a discrete focal polarization displacer with a birefringent crystal in the focal region of a lens, according to one embodiment.

One embodiment presented in this disclosure is a polarization displacer that includes a focusing lens configured to receive optical signals and a birefringent crystal, which is aligned with the focusing lens, configured to separate the optical signals into at least two separate signals based on having different polarization states. Further, the birefringent crystal is within a focal region of the focusing lens and an optical axis of the birefringent crystal is set so that respective focal points of the at least two separate signals are at an output surface of the polarization displacer where the at least two separate signals are output from the polarization displacer.

Another embodiment presented in this disclosure is a polarization displacer that includes a focusing lens configured to receive optical signals and a birefringent crystal, on which the focusing lens is disposed, configured to separate the optical signals into at least two separate signals based on having different polarization states, wherein an optical axis of the birefringent crystal is set so that respective focal points of the at least two separate signals are at an output surface of the birefringent crystal.

Another embodiment presented in this disclosure is a displacer array that includes a plurality of focusing lenses wherein at least one is configured to receive optical signals and a single birefringent crystal on which the plurality of focusing lenses is disposed, wherein the birefringent crystal is configured to separate the optical signals into at least two separate signals based on having different polarization states.

EXAMPLE EMBODIMENTS

Traditional PBSs are significantly larger than the beam offset between the split polarization signals and require precision-alignment or precision-manufacturing. In addition, PBDs that use birefringent crystals typically have a length that is ten times longer than the desired beam offset between the split polarization signals. The long lengths required by PBDs with birefringent crystals make these PBDs costly and limits miniaturization where the PBD can interface with smaller optical devices, such as photonic chips. Embodiments herein describe a focal polarization displacer with a birefringent crystal disposed within the focal region of a lens. While polarization splitting components are typically disposed between collimating and focusing lenses, this limits the minimum beam offset between the split polarization signals to the diameter of the lenses. However, in the embodiments below, the polarization splitting component (e.g., the birefringent crystal) is disposed in a focal region of the focusing lens which permits the beam offset to no longer be limited by the diameter of the lenses. Instead of having minimum beam offsets of 500 microns for typical micro-lenses, the focal polarization displacers discussed herein can have beam offsets less than 50 microns. This permits much smaller birefringent crystals (which reduces cost) and enables miniaturization so the focal polarization displacers can more efficiently interface with optical devices with higher levels of integration and complexity, such as photonic chips.

In one embodiment, the optical axis of the birefringent crystal is set so that the two polarization signals have focal points on the same plane. In one embodiment, this plane is the output surface of the focal polarization displacer such as an output surface of the birefringent crystal or some other end layer in the focal polarization displacer. That way, the focal polarization displacer can be directly connected to optical inputs of a separate photonic device, such as two grating couplers on a photonic chip. When properly aligned, the two polarization signals output by the focal polarization displacer are focused at the two grating couplers.

FIG. 1 illustrates a discrete focal polarization displacer 100 with a birefringent crystal 105 in the focal region of a lens 110, according to one embodiment. In this embodiment, the discrete focal polarization displacer 100 includes the lens 110 which receives collimated light 115 which contains optical signals with different polarization states and a birefringent crystal 105 which separates or splits the light 115 into a P-polarization signal 125 and a S-polarization signal 130. That is, the collimated light 115, which can be received from a light source such as an optical fiber, includes light (or optical signals) with both P- and S-polarizations. As the light 115 travels through the birefringent crystal 105, the P-polarization light is separated from the S-polarization light. That is, the birefringent crystal 105 separates the optical signals into at least two separate signals based on having different polarization states. While the embodiments herein illustrate separating two signals, the same structure can be used to separate more than two optical signals that have different polarization states.

The lens 110 is a focusing lens which focuses the collimated light 115. Although not shown, a collimating lens may be disposed to the left of the lens 110 in order to collimate the light 115; however, this is not a requirement. In other embodiments, the received light may not be collimated prior to being receiving by the lens 110. Doing so means a collimating lens can be omitted, which can further shrink the optical system that includes the focal polarization displacer 100.

The birefringent crystal 105 is disposed in a focal region 120 (also referred to as its focal length) of the lens 110, which is the region the light is focused until it reaches its focal point. In FIG. 1, the focal region 120 ends at an output surface 140 of the birefringent crystal 105. That is, the two focal points of the P- and S-polarization signals 125, 130 are at the output surface 140 of the crystal 105. As such, the P- and S-polarization signals 125, 130 have focal points arranged on the same plane—i.e., the plane defined by the output surface 140.

The focal polarization displacer 100 controls the location of the focal points of the P- and S-polarization signals 125, 130 using an optical axis 135 of the birefringent crystal 105. Examples of suitable materials for the crystal 105 include Yttrium Vanadate (YVO4), Alpha Barium Borate (α-BBO), Calcite, or Rutile which each have an optical axis 135 that can be set when these crystals are grown. In one embodiment, the optical axis 135 has an optical axis that is between 25-65 degrees. In one embodiment, the optical axis 135 is between 45-60 degrees. The optical axis 135 can vary depending on the specific material used as the birefringent crystal 105. In any case, the optical axis 135 can be set when fabricating or growing the birefringent crystal 105 so that the P- and S-polarization signals 125, 130 have focal points on the same plane, which is orthogonal to the axis in which the light 115 is received at the lens 110.

In FIG. 1, the optical axis 135 of the birefringent crystal 105 sets the focal points of the P- and S-polarization signals 125, 130 at the output surface 140 of the birefringent crystal 105. As such, the birefringent crystal 105 is disposed entirely within the focal region 120 of the lens 110. However, in other embodiments, the focal points of the P- and S-polarization signals 125, 130 may not be at the output surface 140 of the crystal 105. Instead, the focal points can be at a plane that is proximate to the output surface 140 (e.g., within 30 microns). For example, the focal points may be at a vertical plane that is slightly to the left or right of the output surface 140 of the birefringent crystal 105. If the focal points align on a plane that is to the left of the output surface 140, then the birefringent crystal 105 would not be entirely within the focal region 120.

In one embodiment, there may be additional layers or materials disposed on the surface 140 of the birefringent crystal 105 (which is discussed in embodiments below). The optical axis 135 can nonetheless be set so that the focal points of the P- and S-polarization signals 125, 130 are at an output surface of the additional layer. In general, it may be desired to set the focal points of the P- and S-polarization signals 125, 130 at whatever output surface of the focal polarization displacer 100 that is used to interface with a downstream optical device (e.g., a photonic chip). That way, the P- and S-polarization signals 125, 130 are focused at (or near) this output surface so the signals 125, 130 are efficiently transferred from the displacer 100 to the downstream optical device. However, it is not necessary for the P- and S-polarization signals 125, 130 to be focused precisely at the output surface of the focal polarization displacer 100 but doing so might result in the most efficient transfer of the signals 125, 130.

The displacer 100 in FIG. 1 is a discrete displacer 100 since the lens 110 and the birefringent crystal 105 are discrete components. These two components may be held in alignment with each other using an optical bench or some sort of adhesive (e.g., an epoxy).

In one embodiment, the distance between the two focal points of the P- and S-polarization signals 125, 130 (referred to herein as the "beam offset") is 20-50 microns, which is sufficient to separate out the two polarizations images of an optical signal transmitted by an optical fiber. Thus, the discrete focal polarization displacer 100 can be used in an optical system where a small beam offset is desired. Unlike other displacers where the minimum beam offset is limited by the diameter of the lens (i.e., the beam offset cannot be smaller than the diameter of the lens without incurring optical losses), the beam offset for the displacer 100 is not tied or limited to the diameter of the lens 110. For example, the lens 110 can have a diameter of 250-500 microns but the beam offset for the signals 125, 130 can be less than 50 microns. Further, the thickness of the birefringent crystal 105 can be 200-500 microns. Thus, the total width (or thickness) of the focal polarization displacer 100 can be much smaller than other types of polarization displacers while also achieving a smaller beam offset for the P- and S-polarization signals 125, 130.

Figure 2:
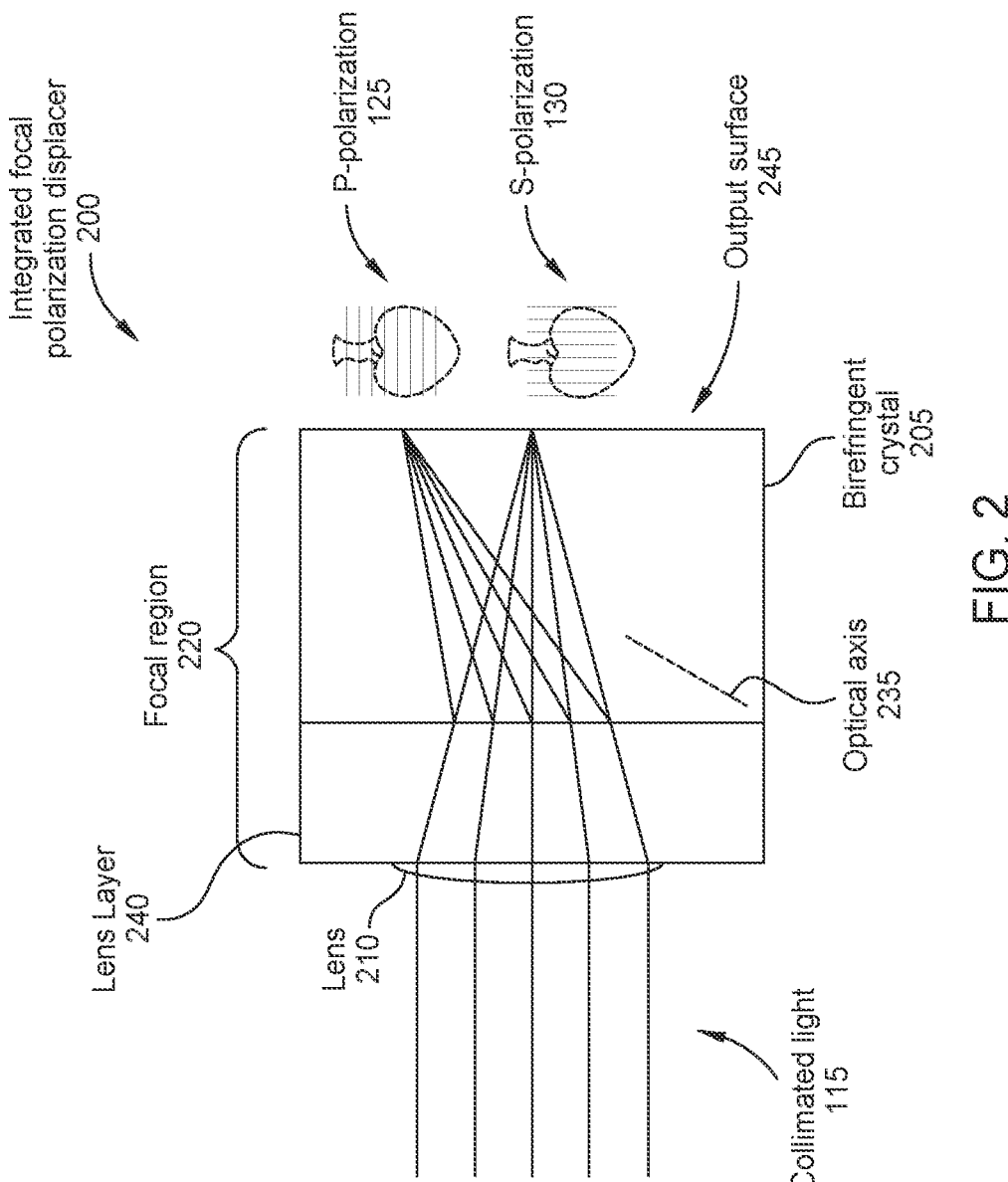
FIG. 2 illustrates an integrated focal polarization displacer with a birefringent crystal in the focal region of a lens, according to one embodiment.

FIG. 2 illustrates an integrated focal polarization displacer 200 with a birefringent crystal 205 in the focal region 220 of a lens 210, according to one embodiment. Unlike in FIG. 1 where the displacer 100 has discrete components, the integrated focal polarization displacer 200 includes integrated components. As shown, the lens 210 is disposed on a lens layer 240 which is in turn disposed on the birefringent crystal 205.

In one embodiment, the lens layer 240 is a slab of dielectric material into which the lens 210 is formed or attached. For example, the lens 210 can be fabricated in the lens layer 240 using lithographical methods, imprinting, or molding. As shown, the material of the lens layer 240 does not affect the light 115 (i.e., is optically transparent). Instead, the light 115 does not begin to separate into the two P- and S-polarization signals 125, 130 until reaching the birefringent crystal 205.

Like in FIG. 1, the optical axis 235 of the birefringent crystal 205 sets the focal points of the P- and S-polarization signals 125, 130. In this example, the focal points are set at an output surface 245 of the birefringent crystal 205. As such, the birefringent crystal 205 is disposed entirely within the focal region 220 of the lens 210. However, in other embodiments, the focal points of the P- and S-polarization signals 125, 130 may not be at the output surface 245 of the crystal 205. For example, the focal points may be at a vertical plane that is slightly to the left or right of the output surface 245 of the birefringent crystal 205. If the focal points align on a plane that is to the left of the output surface 245, then the birefringent crystal 205 would not be entirely within the focal region 220.

In one embodiment, there may be additional layers or materials disposed on the surface 245 of the birefringent crystal 205 (which is discussed in embodiments below). The optical axis 235 can nonetheless be set so that the focal points of the P- and S-polarization signals 125, 130 are at an output surface of the additional layer. As stated above, it may be desired to set the focal points of the P- and S-polarization signals 125, 130 at whatever output surface of the focal polarization displacer 200 that is used to interface with a downstream optical device (e.g., a photonic chip). That way, the P- and S-polarization signals 125, 130 are focused at (or near) this output surface so the signals 125, 130 are efficiently transferred from the displacer 200 to the downstream optical device. However, it is not necessary for the P- and S-polarization signals 125, 130 to be focused precisely at the output surface of the focal polarization displacer 200.

In one embodiment, the distance between the two focal points of the P- and S-polarization signals 125, 130 (referred to herein as the "beam offset") is 20-50 microns, which is sufficient to separate out the two polarizations images of an optical signal transmitted by an optical fiber. Thus, the discrete focal polarization displacer 200 can be used in an optical system where a small beam offset is desired. In one embodiment, the lens 210 can have a diameter of 250-500 microns but the beam offset for the signals 125, 130 can be less than 50 microns. Further, the thickness/width of the birefringent crystal 205 can be 200-500 microns. The thickness/width of the lens layer 240 can range from 500 microns to 1 millimeter in thickness. Thus, the total width (or thickness) of the focal polarization displacer 200 can be much smaller than other types of polarization displacers while also achieving a smaller beam offset for the P- and S-polarization signals 125, 130.

The integrated focal polarization displacer 200 may have certain advantages over the discrete focal polarization displacer 100 in FIG. 1 such as having a smaller thickness/width and being easier to fabricate. Moreover, as discussed in FIGS. 6 and 7, the basic design of the integrated focal polarization displacer 200 can be expanded to form an array of focal polarization displacers 200.

In any case, both the discrete focal polarization displacer 100 and the integrated focal polarization displacer 200 have advantages over previous polarization displacers due to their ability to enable smaller beam offsets. Further, the displacers 100 and 200 can have smaller birefringent crystals (e.g., crystals with smaller widths/thickness) which make them less costly and easier to process (e.g., polish).

Moreover, while the embodiments above discussed using the displacers 100 and 200 in FIGS. 1 and 2 to transmit optical signals into an optical element, the process can be reversed where optical signals are transmitted from the optical element, to the birefringent crystal, the lens, and eventually to an external optical system (e.g., an optical fiber). In that case, the birefringent crystal receives, at two different locations, two separate optical signals having different polarization states, merges the two separate optical signals, and aligns the merged optical signals with the lens. The lens can then transmit the merged optical signals to an external optical elements such as another lens or an optical fiber. Moreover, signals may also pass through the displacers 100 and 200 in both directions at the same time.

Figure 3:
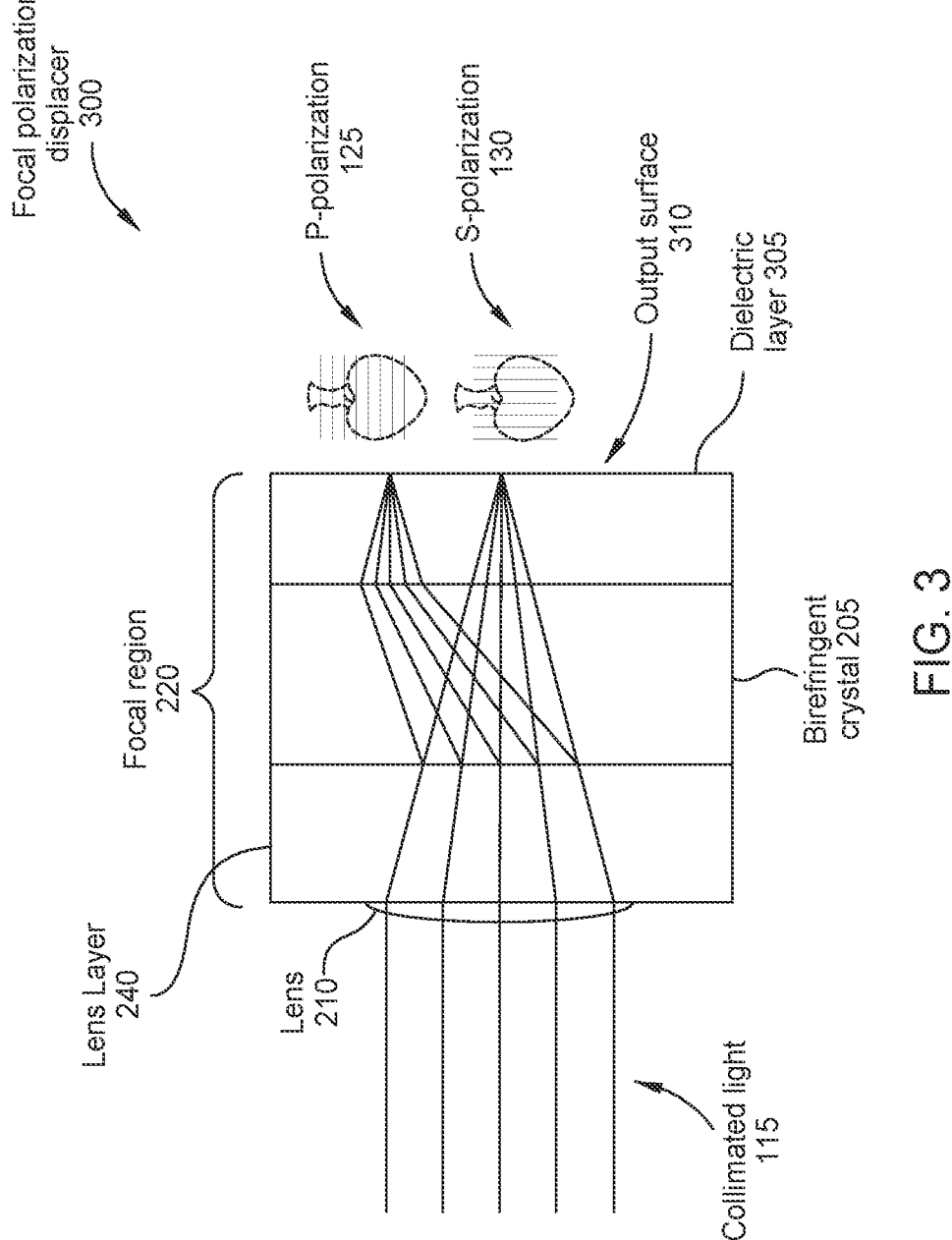
FIG. 3 illustrates a focal polarization displacer with an additional layer in the focal region of a lens, according to one embodiment.

FIG. 3 illustrates a focal polarization displacer 300 with an additional layer in the focal region of a lens, according to one embodiment. The focal polarization displacer 300 is the same overall structure as the integrated focal polarization displacer 200 in FIG. 2 except the addition of an optically transparent dielectric layer 305.

The focal polarization displacer 300 can be used to adjust the beam offset between the P- and S-polarization signals 125, 130 relative to the focal polarization displacer 200 in FIG. 2. Specifically, the thickness/width of the birefringent crystal 105 can be smaller than the focal region 220 (or focal length) of the lens 210. This means the light 115 travels a shorter distance through the birefringent crystal 105, and thus, the P- and S-polarization signals 125, 130 in the light 115 have less separation relative to the focal polarization displacer 200 where the birefringent crystal 105 is entirely within the focal region 220 of the lens 210.

The dielectric layer 305 does not affect the separation of the P- and S-polarization signals 125, 130, so the beam offset is not changed as the light propagates through the dielectric layer 305. Instead, the dielectric layer 305 acts like a spacer to take up the remaining portion of the focal region 220 or focal length. Thus, the focal points of the P- and S-polarization signals 125, 130 are at an output surface 310 defined by the dielectric layer 305. In one example, the combined optical length (i.e., length times refractive index) of the birefringent crystal 205 and the dielectric layer 305 in FIG. 3 may be the same as the optical length of the birefringent crystal 205 in FIG. 2. However, by reducing the optical length of the birefringent crystal 205 in FIG. 3, the beam offset between the P- and S-polarization signals 125, 130 can also be reduced.

However, the same affect can be achieved if the dielectric layer 305 is instead disposed between the lens layer 240 and the birefringent crystal 205. In that case, the focal points of the P- and S-polarization signals 125, 130 would be at an output surface of the birefringent crystal 205, but the beam offset would be the same as the example shown in FIG. 3.

In another embodiment, a thermal expansion layer is disposed between the lens layer 240 and the birefringent crystal 205. Because the material of the lens layer 240 may have a much different thermal expansion coefficient than the birefringent crystal 205, the thermal expansion layer can serve as an intermediary to prevent damage or excessive strain on the focal polarization displacer during temperature changes. This embodiment can also be used to reduce the beam offset, since the thickness of the birefringent crystal 205 can be reduced. However, if the designer does not want to reduce the beam offset, a different lens 210 can be used that has a longer focal region so that the same beam offset is achieved as a focal polarization displacer that does not have the thermal expansion layer.

Figure 4:
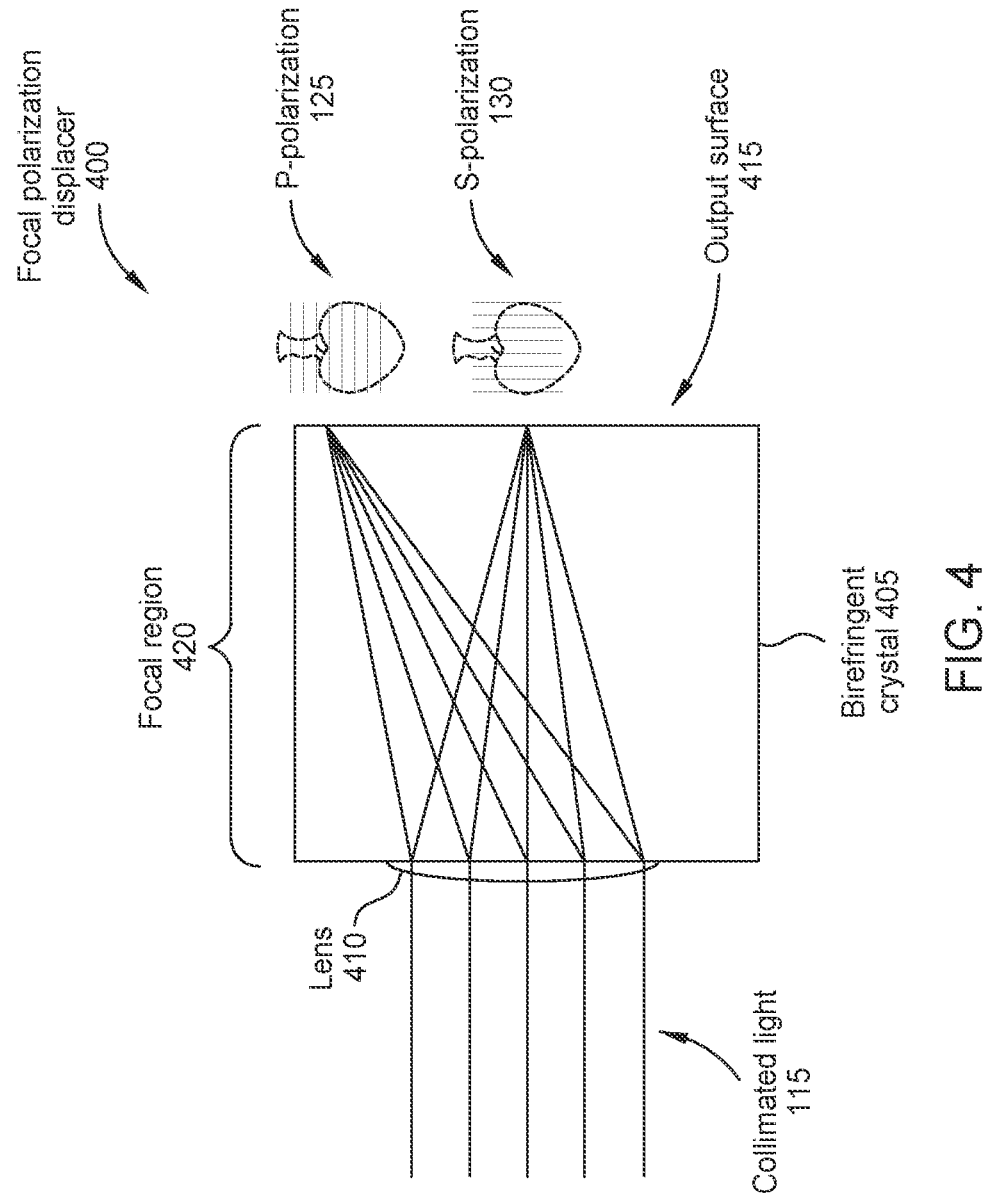
FIG. 4 illustrates a focal polarization displacer with a lens formed directly on the birefringent crystal, according to one embodiment.

FIG. 4 illustrates a focal polarization displacer 400 with a lens 410 formed directly on the birefringent crystal, according to one embodiment. The focal polarization displacer 400 is an integrated displacer, but does not have a lens layer. That is, rather than forming the lens from the material of the lens layer (e.g., using lithographical methods, imprinting, or molding) the lens 410 is instead formed directly on the birefringent crystal 405.

In one embodiment, a polymer droplet is dispensed on the birefringent crystal 405 which then hardens into a shape of the lens 410. Like with the lenses formed from a lens layer, by controlling the size of the droplet, the focal region 420 can be set so that the focal points of the P- and S-polarization signals 125, 130 are at an output surface 415 of the birefringent crystal 405. Thus, the focal polarization displacer 400 can function the same as the previous embodiments.

In another embodiment, the lens 410 is formed directly from the material of the birefringent crystal 405. In that case, the lens 410 and the crystal 405 are the same material. The crystal 405 can be, for example, polished or etched to form the shape of the lens 410.

Moreover, instead of forming the lens 410 on/from the birefringent crystal 405, there may be a dielectric layer or a thermal expansion layer disposed between the crystal 405 and the lens 410. In that example, the lens 410 can be formed on that layer rather than the birefringent crystal 405. For instance, a polymer droplet can be dispensed on the dielectric layer to form the lens 410.

In yet another example, the focal polarization displacer 400 can include a dielectric layer disposed on the surface 415 of the birefringent crystal 405 so the thickness of the crystal 405 can be reduced to shrink the beam offset as discussed in FIG. 3. In that case, the lens 410 can be formed so that the focal points of the P- and S-polarization signals 125, 130 are at an output surface of the dielectric layer.

Figure 5:
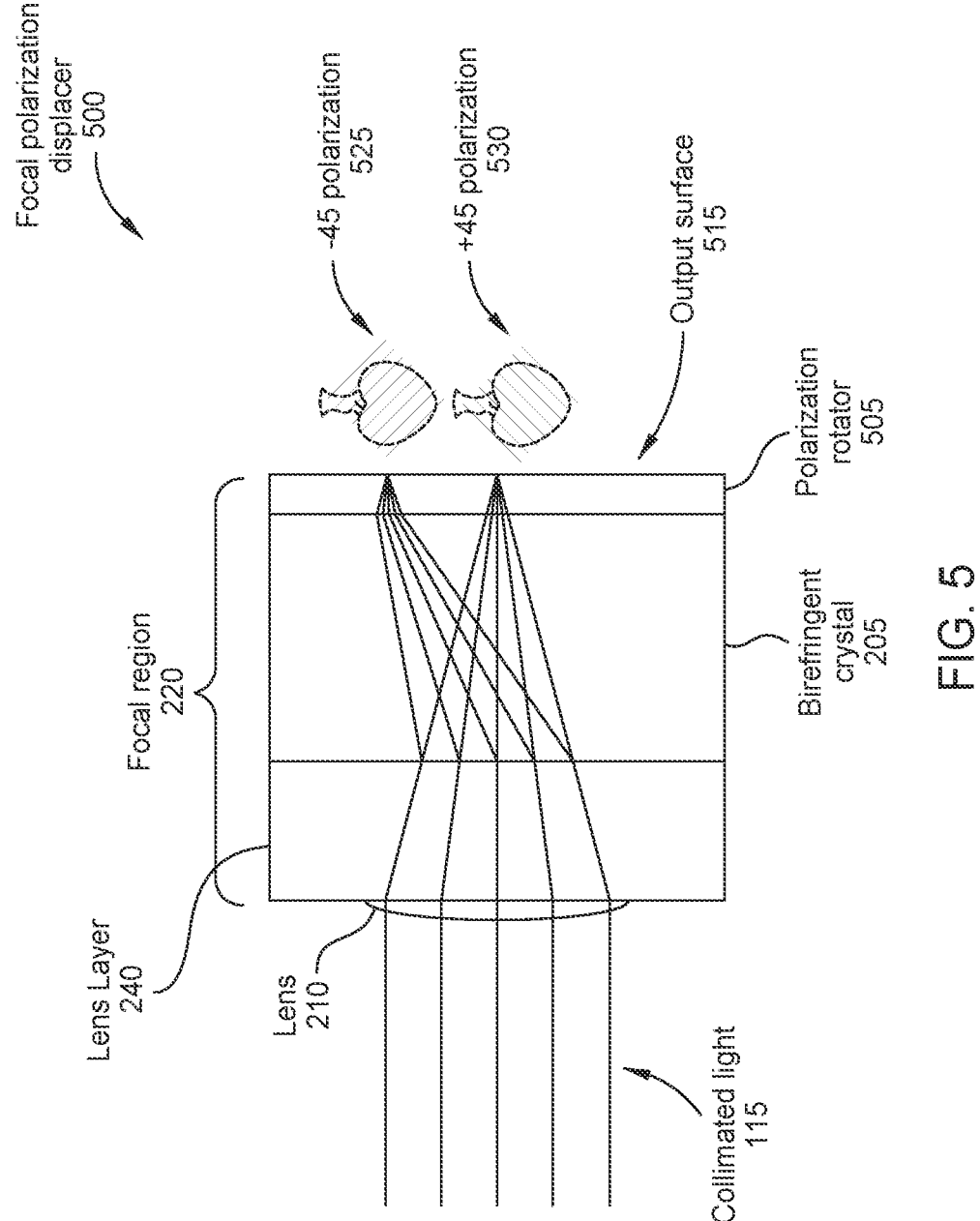
FIG. 5 illustrates a focal polarization displacer with a polarization rotator, according to one embodiment.

FIG. 5 illustrates a focal polarization displacer 500 with a polarization rotator 505, according to one embodiment. The focal polarization displacer 500 has the same general structure as the focal polarization displacer 300 in FIG. 3 except that the polarization rotator 505, instead of a dielectric layer, is disposed at the rightmost end of the displacer 500.

While the birefringent crystal 205 separates the two different polarization images in the light 115, the polarization rotator 505 rotates the polarization states of those images. In this example, the polarization rotator 505 generates a −45 polarization signal 525 and a +45 polarization signal 530. However, applying a +/−45 degree polarization is just one example and different rotators 505 can be added to the focal polarization displacer 500 to achieve different polarizations.

Moreover, FIG. 5 illustrates that the polarization rotator 505 is still within the focal region 220 of the lens 210 so that focal points of the −45 and +45 polarization signals 525, 530 are at an output surface 515 of the polarization rotator 505. Thus, like the focal polarization displacer 300, the focal polarization displacer 500 can then directly interface with a downstream photonic element to efficiently transfer the signals 525, 530.

Figure 6:
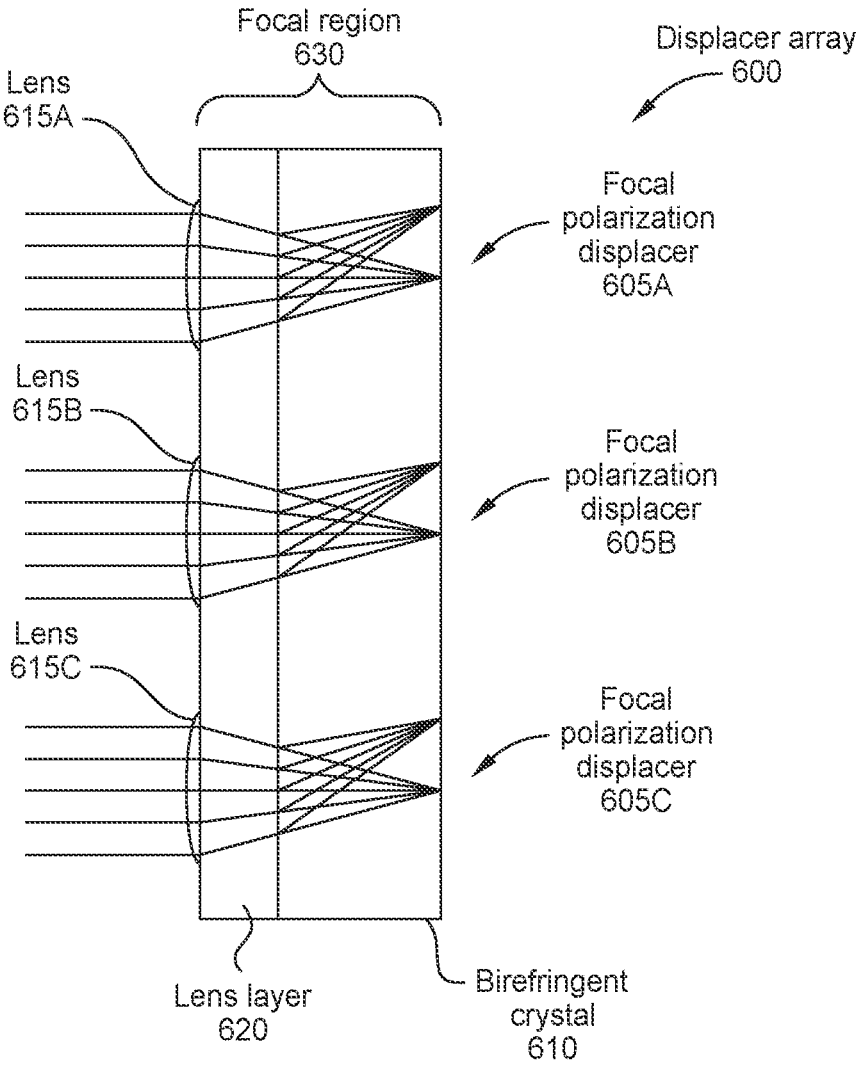
FIG. 6 illustrates an array of focal polarization displacers, according to one embodiment.

FIG. 6 illustrates an array 600 of focal polarization displacers 605, according to one embodiment. In this embodiment, the displacer array 600 includes three focal polarization displacers 605A-C which each includes the birefringent crystal 610, lens layer 620, and lenses 615. While three displacers 605 are shown, the array 600 can include any number of displacers (e.g., four or more, or less than three). Further, the array 600 in FIG. 6 is a one-dimensional array but other embodiments can include a 2D array with focal polarization displacers arranged in rows and columns.

In one embodiment, the birefringent crystal 610 is a unitary crystal that extends between (or is shared by) the three focal polarization displacers 605A-C. However, in other embodiments, the array 600 can be formed by bonding together three different birefringent crystals 610.

The lens layer 620 can also be a unitary layer that extends between the three focal polarization displacers 605A-C. A respective one of the lenses 615A-C can then be formed in the layer 620 for each of the three focal polarization displacers 605A-C. In FIG. 6, the lenses 615A-C may be the same such that they have the same focal region 630. Since the thicknesses/widths of the lens layer 620 and the birefringent crystal 610 are also the same for the three focal polarization displacers 605A-C, this results in the focal points of the two polarization signals being on a rightmost surface of the birefringent crystal 610. Thus, the displacer array 600 can directly interface with downstream photonic element to efficiently transfer the polarization signals.

In other embodiments, the array 600 can include additional layers such as a dielectric layer between the lens layer 620 and the birefringent crystal 610 or disposed on the rightmost surface of the birefringent crystal 610 in order to decrease the thickness of the birefringent crystal and decrease the beam offset in each of the displacers 605A-C. This was discussed in FIG. 3. Or the array 600 can include a thermal expansion layer between lens layer 620 and the birefringent crystal 610. In yet another example, the array 600 may not have the lens layer 620 and instead the lenses 615 are formed directly on the birefringent crystal 610. This was discussed in FIG. 4 where a polymer can be used to form the lenses 615, or the lenses can be etched from the crystal 610 itself. Additionally, the array 600 can include a polarization rotator on the rightmost surface of the birefringent crystal 610, as discussed in FIG. 6.

Moreover, the discrete focal polarization displacer 100 in FIG. 1 can also be converted into an array having multiple focal polarization displacers. In that case, the array could have a discrete lens for each focal polarization displacers, but the displacers could share the same birefringent crystal as shown in the array 600.

Figure 7:
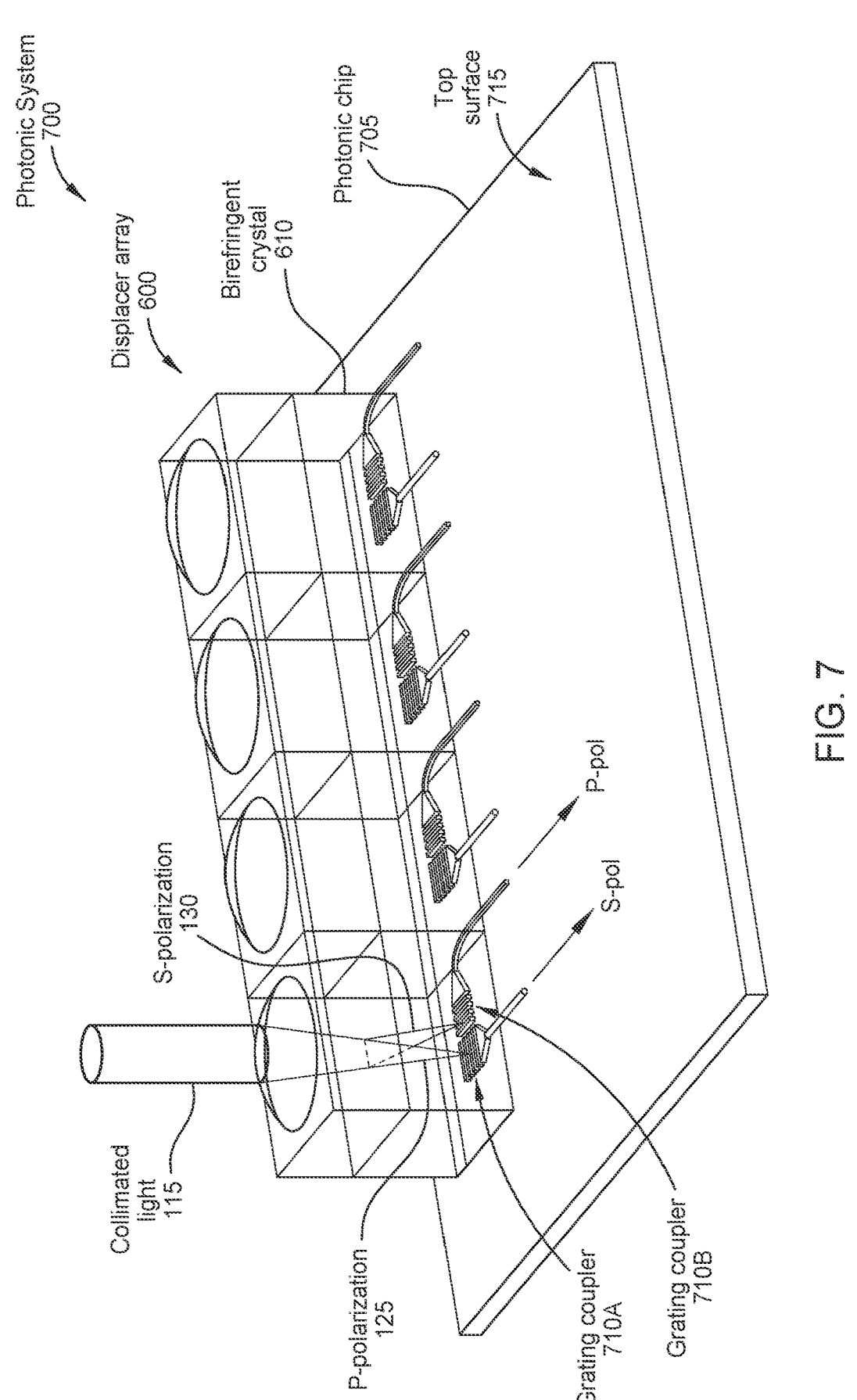
FIG. 7 illustrates interfacing an array of focal polarization displacers with a photonic chip, according to one embodiment.

FIG. 7 illustrates interfacing an array of focal polarization displacers with a photonic chip, according to one embodiment. Specifically, FIG. 7 illustrates connecting the displacer array 600 in FIG. 6 to a photonic chip 705 to form a photonic system 700. As shown, the photonic chip 705 includes multiple pairs of grating couplers 710 disposed on its top surface 715. The most efficient type of grating couplers couples only one polarization. In this example, the grating coupler 710A is designed to receive the P-polarization signals 125 while the grating coupler 710B is designed to receive S-polarization signals 130, which may be more efficient than using a grating coupler that receives light have multiple polarizations (e.g., if the light was coupled directly into the photonic chip 705 without using the array 600). That is, the grating couplers 710A and 710B are optimized to couple to the respective polarization signals 125, 130.

Due to the advancements in fabricating photonic chips (especially silicon photonic chips), the grating couplers 710 in each pair may have a pitch (or separation distance) of only 20-50 microns. As discussed above, the focal polarization displacers described herein can have beam offsets that match the pitches between the grating couplers. As shown in FIG. 7, the birefringent crystal 610 separates the P- and S-polarization signals 125, 130 such that when these signals exit the displacer array 600, they have a beam offset that aligns them to the grating couplers 710A and 710B. By knowing the pitch between the grating couplers 710, a corresponding displacer array 600 can be designed by controlling the thickness of the birefringent crystal 610 to generate a beam offset that matches the pitch.

In this example, the displacer array 600, and more specifically, the birefringent crystal 610 directly contacts the top surface 715 of the photonic chip. Thus, coupling efficiency is improved if the focal points of the P- and S-polarization signals 125, 130 are at or near the coupling interface between the birefringent crystal 610 and the top surface 715 since that is the location of the grating couplers 710. However, in other embodiments the displacer array 600 may not directly contact the top surface 715 of the photonic chip 705 if an epoxy or adhesive is disposed between the array 600 and the top surface that creates a separation. In that case, the displacer array 600 may be designed so that the focal points of the P- and S-polarization signals 125, 130 are beyond the birefringent crystal 610 so these signals are focused at the grating couplers 710. As mentioned above, the location of the focal points of the P- and S-polarization signals 125, 130 can be controlled by the optical axis of the birefringent crystal 610 and the focal region of the lenses in the array 600. Instead of S- and P-polarization, the displacer array 600 may be designed to split signals into a pair of polarization states with a different polarization angle. Within the pair, the two polarization states are 90 deg rotated.

The array 600 permits multiple channels to be coupled to the photonic chip 705 while using very little space. This allows for the highest possible density of optical connections between the photonic chip and external optical systems.

In another embodiment, rather than using the array 600 to couple light into the photonic chip 705 at the top surface, the array 600 can be used to couple light into the photonic chip 705 at an edge (e.g., a surface of the chip 705 that is perpendicular to the top surface 715), which is known as edge coupling. Put differently, the focal polarization displacers in the array 600 can be attached to the end facet of the photonic chip 705 and focus onto two different waveguides for the two polarizations. In that case, grating couplers would not be used, but other types of edge coupling structures may be used to couple the polarization signals 125, 130 into respective waveguides.

Moreover, while the embodiments above discussed using the array 600 to transmit optical signals into the photonic chip 705, the process can be reversed where optical signals are transmitted from the grating couplers 710, to the array 600, and eventually to an external optical system (e.g., an optical fiber). In that case, the birefringent crystal receives, at two different locations, two separate optical signals having different polarization states from two different grating couplers 710, merges the two separate optical signals, and aligns the merged optical signals with one of the lenses. The lens can then transmit the merged optical signals to an external optical elements such as another lens or an optical fiber. Further, it can be considered that some displacers in the array 600 may transmit signals to the photonic chip 705, while other displacers in the same array 600 receive signals from the photonic chip 705. Moreover, signals may also pass through displacers in both directions at the same time.

In one embodiment, the photonic chip 705 is a semiconductor on insulator (SOI) device. The SOI device can include a surface layer, a buried insulation layer (also referred to as buried oxide (BOX) layer), and a semiconductor substrate. The surface layer and substrate can be silicon or other semiconductors or other optically transmissive materials.

The photonic chip 705 can include a variety of different optical components that receive the P- and S-polarization signals 125, 130. In one embodiment, the chip 705 includes an optical modulator that modulates one or both of the signals 125, 130 using a digital control signal.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

I claim:

1. A polarization displacer, comprising:
a focusing lens configured to receive optical signals; and
a birefringent crystal, which is aligned with the focusing lens, configured to receive the optical signals from the focusing lens and separate the optical signals into at least two separate signals based on having different polarization states, wherein the birefringent crystal is disposed within a focal region of the focusing lens, such that the focal region extends at least partially within the birefringent crystal, wherein an optical axis of the birefringent crystal is set so that respective focal points of the at least two separate signals are aligned at an output surface of the birefringent crystal that is configured for direct coupling to an external optical layer, and wherein the at least two separate signals are output from the polarization displacer at the output surface of the birefringent crystal.

2. The polarization displacer of claim 1, wherein the focusing lens is formed from a lens layer disposed on the birefringent crystal, wherein the lens layer is between the focusing lens and the birefringent crystal.

3. The polarization displacer of claim 2, further comprising a thermal expansion layer disposed between the lens layer and the birefringent crystal.

4. The polarization displacer of claim 2, further comprising an optically transparent dielectric layer disposed between the lens layer and the birefringent crystal.

5. The polarization displacer of claim 1, further comprising a plurality of focusing lenses disposed on the birefringent crystal for forming an array for interfacing with a plurality of light sources.

6. The polarization displacer of claim 1, further comprising an optically transparent layer disposed between the focusing lens and the birefringent crystal.

7. The polarization displacer of claim 6, wherein the optically transparent layer comprises at least one of a thermal expansion layer or an optically transparent dielectric layer.

8. A polarization displacer, comprising:
a focusing lens configured to receive optical signals; and
a birefringent crystal, on which the focusing lens is disposed, configured to separate the optical signals into at least two separate signals based on having different polarization states, wherein the birefringent crystal is disposed within a focal region of the focusing lens, such that the focal region extends at least partially within the birefringent crystal, wherein an optical axis of the birefringent crystal is set so that respective focal points of the at least two separate signals are aligned at an output surface of the birefringent crystal that is configured for direct coupling to an external optical layer, and wherein the at least two separate signals are output from the polarization displacer at the output surface of the birefringent crystal.

9. The polarization displacer of claim 8, wherein the focusing lens is formed from a polymer droplet disposed on the birefringent crystal.

10. The polarization displacer of claim 8, wherein the focusing lens contacts the birefringent crystal.

11. The polarization displacer of claim 8, wherein the focusing lens is formed from a material of the birefringent crystal.

12. A displacer array, comprising:

a plurality of focusing lenses, wherein at least a first focusing lens of the plurality of focusing lenses is configured to receive optical signals; and a single birefringent crystal, which is aligned with the plurality of focusing lenses, configured to receive the optical signals from the first focusing lens and to separate the optical signals into at least two separate signals based on having different polarization states, wherein the single birefringent crystal is disposed within focal regions of the plurality of focusing lenses, such that the focal regions extend at least partially within the birefringent crystal, wherein an optical axis of the single birefringent crystal is set so that focal points of the at least two separate signals corresponding to the optical signals are aligned at a same output surface of the single birefringent crystal that is configured for direct coupling to an external optical layer, and wherein the at least two separate signals are output from the displacer array at the same output surface of the single birefringent crystal.

13. The displacer array of claim 12, wherein the single birefringent crystal is configured to (i) receive, at two different locations, two separate optical signals having different polarization states, (ii) merge the two separate optical signals, and (iii) align the merged optical signals with a second focusing lens of the plurality of focusing lenses, wherein the second focusing lens is configured to transmit the merged optical signals to an external optical element.

14. The displacer array of claim 12, further comprising at least one of a thermal expansion layer or an optically transparent dielectric layer disposed between the plurality of focusing lenses and the single birefringent crystal.

15. The displacer array of claim 12, wherein the plurality of focusing lenses are formed from a lens layer disposed on the single birefringent crystal, wherein the lens layer is between the plurality of focusing lenses and the single birefringent crystal.

16. The displacer array of claim 15, further comprising a thermal expansion layer disposed between the lens layer and the single birefringent crystal.

17. The displacer array of claim 15, further comprising an optically transparent dielectric layer disposed between the lens layer and the single birefringent crystal.

18. The displacer array of claim 12, wherein the plurality of focusing lenses are disposed on the single birefringent crystal.

19. The displacer array of claim 18, wherein the first focusing lens is formed from a material of the single birefringent crystal.

20. The displacer array of claim 18, wherein the first focusing lens is formed from a polymer droplet disposed on the single birefringent crystal.

\* \* \* \* \*